(12) United States Patent
Albertsson

(10) Patent No.: US 7,753,182 B2
(45) Date of Patent: Jul. 13, 2010

(54) SPEED CONTROL MECHANISM

(76) Inventor: Stig Albertsson, 161 Dorset Hill Rd., East Dorset, VT (US) 05253

(*) Notice: Subject to any disclaimer, the term of this patent is extended or adjusted under 35 U.S.C. 154(b) by 1105 days.

(21) Appl. No.: 11/267,347

(22) Filed: Nov. 4, 2005

(65) Prior Publication Data

US 2006/0103095 A1 May 18, 2006

Related U.S. Application Data

(60) Provisional application No. 60/627,723, filed on Nov. 12, 2004, provisional application No. 60/650,472, filed on Feb. 7, 2005.

(51) Int. Cl.
*F16D 57/02* (2006.01)
(52) U.S. Cl. ............... 188/293; 188/181 R; 280/28.11; 280/87.01
(58) Field of Classification Search ............... 188/290, 188/293
See application file for complete search history.

(56) References Cited

U.S. PATENT DOCUMENTS

| | | | | |
|---|---|---|---|---|
| 1,584,223 A * | 5/1926 | Horspool et al. | ............ | 188/293 |
| 2,467,932 A | 4/1949 | Foulke | .................... | 280/87.01 |
| 2,688,385 A * | 9/1954 | McLaughlin et al. | ........ | 188/293 |
| 2,775,318 A * | 12/1956 | Smith | .......................... | 188/290 |
| 3,103,260 A * | 9/1963 | Gaines et al. | ................. | 188/19 |
| 3,107,752 A * | 10/1963 | McLean | ..................... | 188/276 |
| 3,521,729 A * | 7/1970 | Ravenel | ..................... | 188/271 |
| 3,543,885 A * | 12/1970 | Ditlow | ........................ | 188/296 |
| 3,861,503 A * | 1/1975 | Nash | .......................... | 188/276 |
| 3,907,079 A * | 9/1975 | Chapman | .................... | 188/290 |
| 4,101,012 A * | 7/1978 | Durand | ....................... | 188/290 |
| 4,497,393 A * | 2/1985 | Brems | ..................... | 188/322.5 |
| 4,898,403 A * | 2/1990 | Johnson | ..................... | 280/842 |
| 5,301,775 A * | 4/1994 | Nedbal et al. | ............... | 188/290 |
| 5,667,229 A | 9/1997 | Wenger | ....................... | 280/22 |
| 7,523,817 B2 * | 4/2009 | Forster | ....................... | 188/308 |
| 2003/0000782 A1 * | 1/2003 | Smith et al. | ................. | 188/290 |

FOREIGN PATENT DOCUMENTS

AU    1245367    9/1971
FR    EP-0130897    6/1984

OTHER PUBLICATIONS

Albertsson et al., U.S. Appl. No. 12/472,552, filed May 27, 2009, entitled "Collision Avoidance Methods And Systems For Gravity Propelled Vehicles", 25-pages.

* cited by examiner

*Primary Examiner*—David D Le
*Assistant Examiner*—Ryan Dodd
(74) *Attorney, Agent, or Firm*—Heslin Rothenberg Farley & Mesiti P.C.

(57) ABSTRACT

A speed restrictor for a gravity driven vehicle is provided. The speed restrictor is configured to limit the speed of the gravity driven vehicle by restricting rotation of a wheel axle while the gravity driven vehicle descends down a mountain track.

30 Claims, 11 Drawing Sheets

18 BLADES ON 2.40 DIA.

7,753,182 B2

SPEED CONTROL MECHANISM

CROSS REFERENCE TO RELATED APPLICATIONS

This application is a Non-provisional of U.S. Provisional Application Ser. No. 60/627,723, filed on Nov. 12, 2004 and U.S. Provisional Application Ser. No. 60/650,472, filed on Feb. 7, 2005, the entire disclosures of which are incorporated herein by reference.

FIELD OF INVENTION

This invention relates generally to a speed control mechanism and, more particularly, to a speed restrictor for a gravity driven vehicle, such as, for example, an alpine sled, bobsled, soap box car, racing cart and the like.

BACKGROUND OF THE INVENTION

During the summer, ski resorts provide a ride down a mountain on a track using a sled. The track typically consists of an assembly of prefabricated sections having a variety of different curves and straight sections. The track is designed and installed to conform to the terrain of the mountain and may vary from 1000 to 5000 feet in length depending on the vertical drop between the start and finish. The tracks are usually installed on a roadbed, in ground, with a pitch varying from, for example, 10 to 22 percent. The track may also be a road, path or other terrain having a pitch or slope.

Conventional sleds use runners for gliding, wheels for providing acceleration and rubber strips for braking. Each sled is designed to carry one rider that controls the speed of the sled using a control stick. The control stick provides acceleration—by moving the stick forward, gliding—by moving the stick to a middle position, and braking—by moving the stick to a rear position.

A track having a high pitch, such as, for example, 16-22 percent, typically uses a sled with front wheels attached to the control stick and runners. As the control stick is moved forward, the wheels lift a portion of the sled chassis away from the track, causing less friction by the runners on the track. A track having a lower pitch, such as, for example, 10-15 percent, typically uses a sled having front and rear wheels and runners. The rear wheels are necessary on lower pitch tracks because of the friction generated by the runners on the track, e.g. the sled would not make it down the track otherwise. Rear wheels are not provided for conventional sleds used on higher pitched tracks because the sled would gain too much speed. A sled without rear wheels, however, will "fishtail", while a sled with rear wheels will not. Therefore, a sled with rear wheels is more stable and less susceptible to accidents, but not usable on a higher pitch tracks because it causes the sled to travel too fast.

As expected, some riders drive too fast down the track, which sometimes results in accidents causing injury. The accidents are usually caused by excess speed causing the rider to fall off the sled and land on the track or, in some cases, to leave the track. When injuries occur, they are usually minor, consisting of scrapes and bruises, but may result in broken bones. However, such injuries are an annoyance to the track operators and can result, from time to time, in lawsuits.

SUMMARY OF THE INVENTION

The shortcomings of the prior art are alleviated by using the speed control mechanism constructed in accordance with one or more aspects of the present invention. Generally described, a speed control mechanism constructed in accordance with the principles of the present invention restricts the speed of a gravity driven vehicle to enable the use of sleds having rear wheels to travel down high pitched tracks or terrain.

The present invention provides, in one aspect, a speed restrictor for a gravity driven vehicle. The speed restrictor includes a housing containing a fluid and mountable to a chassis of the gravity driven vehicle. The speed restrictor also includes at least one rotor mounted on at least one wheel axle of the gravity driven vehicle within the housing. The at least one rotor has an outer periphery surface facing an inner surface of the housing, wherein rotation of the at least one wheel axle slows in response to resistance caused by fluid being forced against the inner surface of the housing during rotation of the at least one wheel axle.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter that is regarded as the invention is particularly pointed out and distinctly claimed in the claims at the conclusion of the specification. The foregoing and other objects, feature and advantages of the invention are apparent from the following detailed description taken in conjunction with the accompanying drawings in which:

Additional features and advantages are realized through the techniques of the present invention. Other embodiments and aspects of the invention are described in detail herein and are considered a part of the claimed invention.

BEST MODE FOR CARRYING OUT THE INVENTION

In one aspect of the present invention there is provided a hydraulic speed restrictor attached to a rear axle assembly of a gravity driven vehicle to allow for more stable, safer and enjoyable rides. For the purpose of convenience only, the speed restrictor will be described in reference to an alpine sled, but it should be understood that the speed restrictor can also be used on other gravity driven vehicles that require control of speed down high pitched terrain, such as, for example, soap box cars, bobsleds, racing carts and the like. Also, it is understood that the speed restrictor can also be applied to a front axle assembly or one or more axle assemblies of a gravity driven vehicle.

Figure 1:
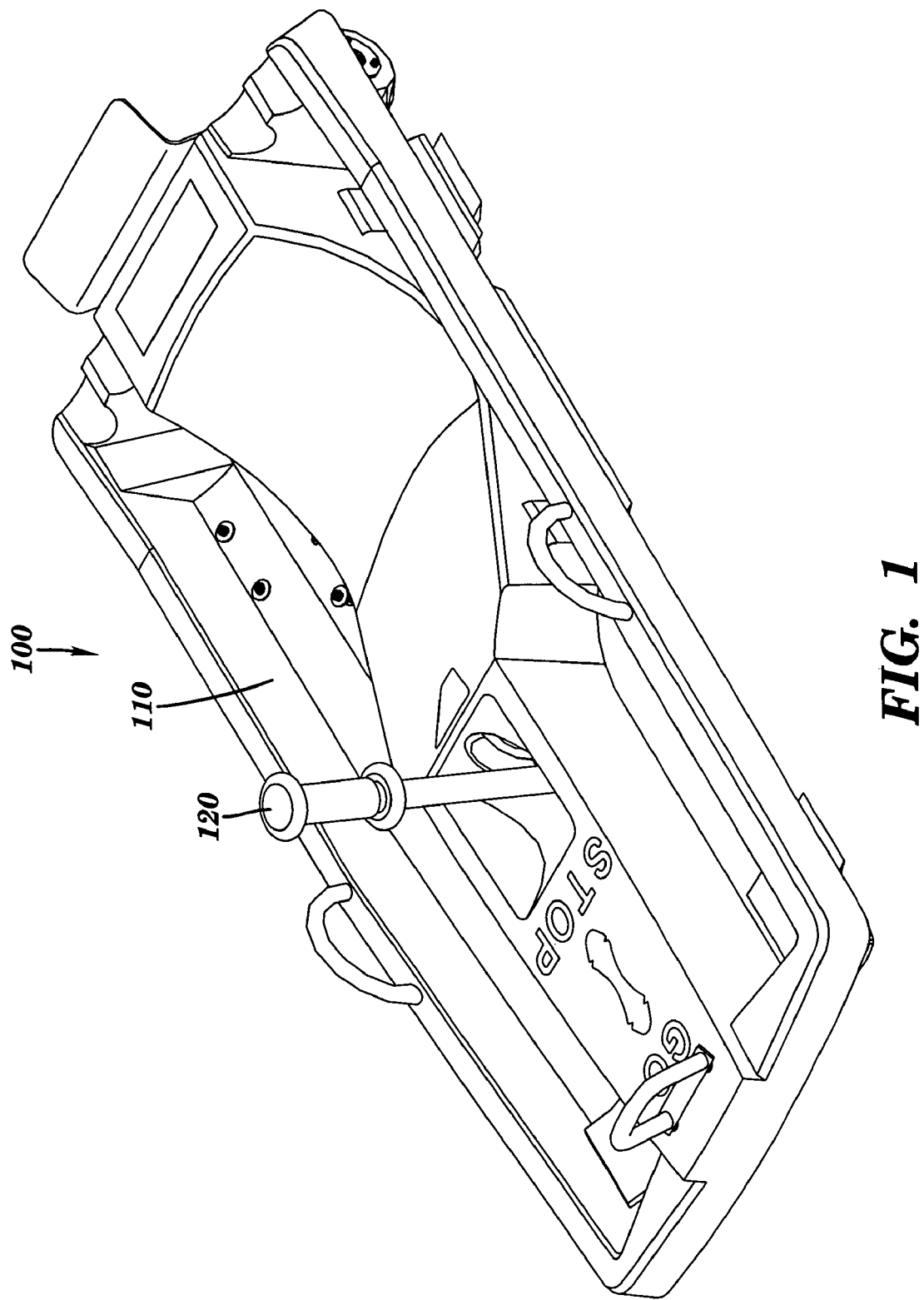
FIG. 1 depicts a perspective view of a top side of a gravity driven sled used on down hill slide rides at ski resorts during the summer.
Figure 2:
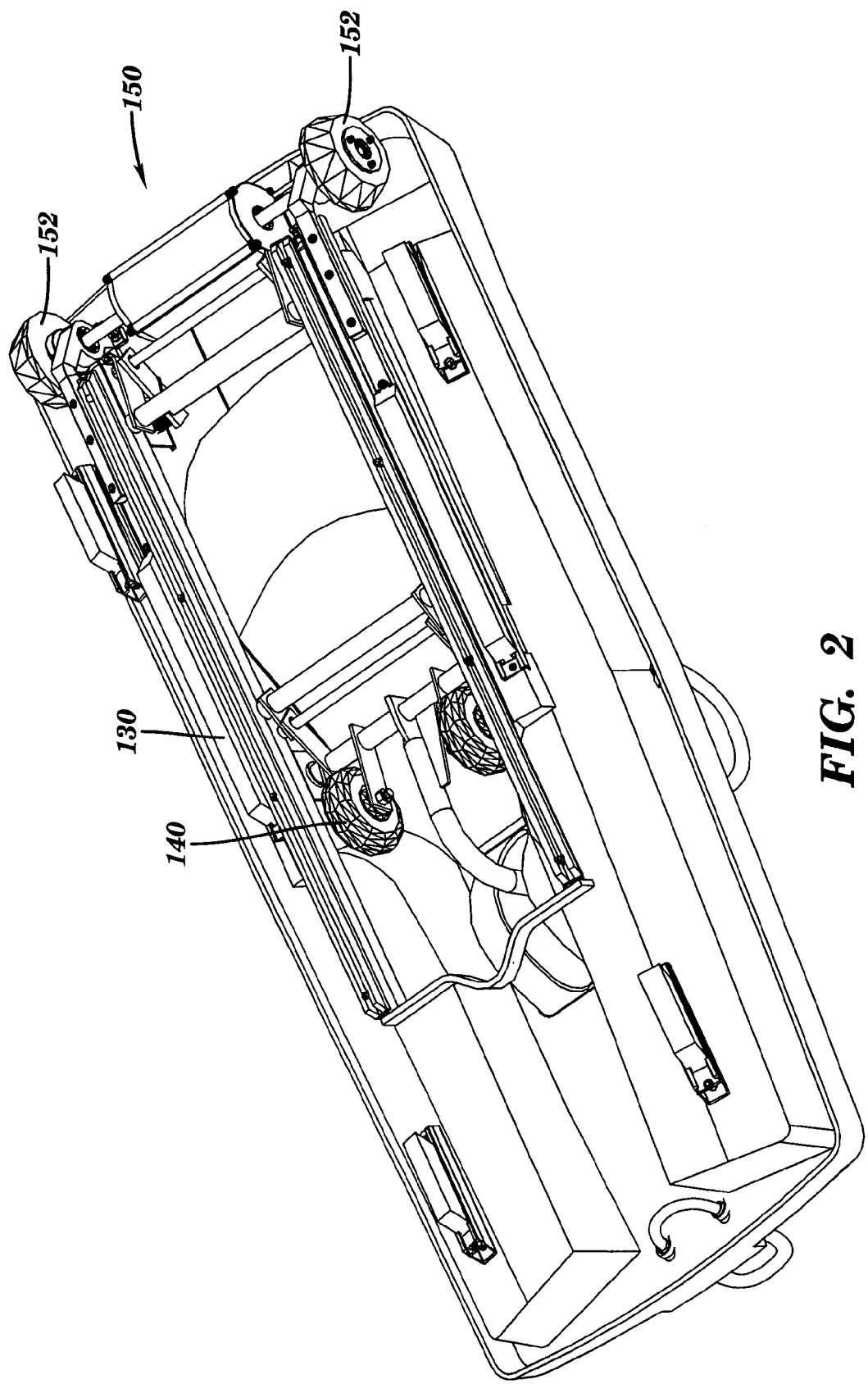
FIG. 2 depicts a perspective view of an undercarriage of the gravity driven sled shown in FIG. 1.

FIGS. 1 and 2 illustrate the top and undercarriage, respectively, of one example of an alpine sled 100 that can be adapted to incorporate a speed restrictor constructed in accordance with one or more aspects of the present invention. Alpine sled 100 includes a chassis 110 for supporting a rider on a top side and a control stick 120 for controlling the acceleration and braking of the sled. Control stick 120 extends through chassis 110 and connects to a front axle assembly of a typical drivetrain mechanism for an alpine sled, which is connected to the undercarriage (FIG. 2) of chassis 110. Drivetrain mechanism includes an assembly of runners 130 and the front axle assembly connected to front wheels 140 used to accelerate and brake sled 100. Control stick 120 is utilized to control the use and contact of front wheels 140 and runners 130 with respect to the surface of the track. For example, as control stick 120 is pushed forward, runners 130 are lifted off the ground, causing alpine sled 100 to move with less friction by using front wheels 140.

Figure 3:
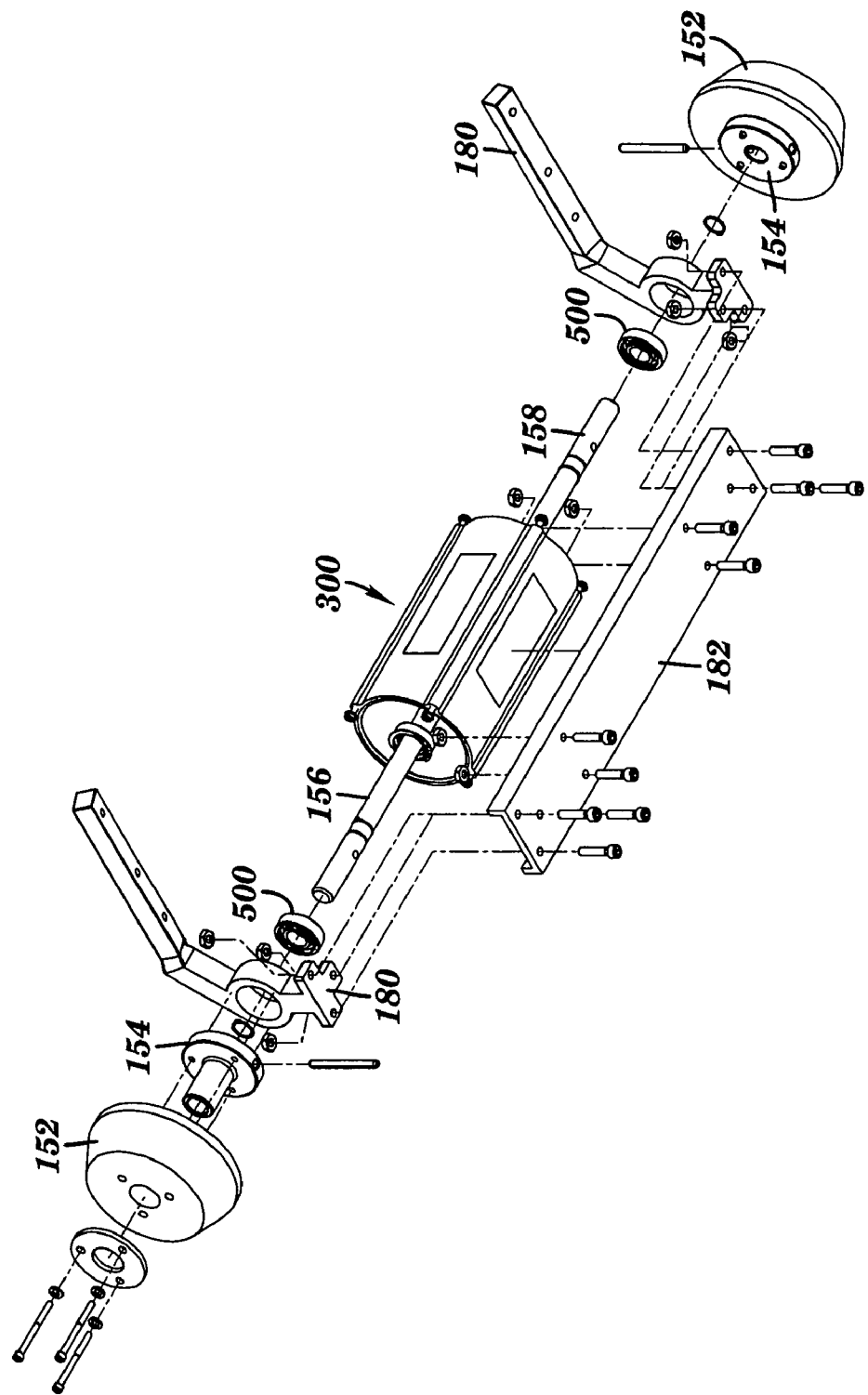
FIG. 3 depicts an exploded view of one embodiment of a rear axle assembly constructed in accordance with the principles of the present invention.

Sled 100 also includes a rear axle assembly 150 including rear wheels 152. Rear axle assembly 150 is mounted to the undercarriage of chassis 110. FIG. 3 illustrates one embodiment of rear axle assembly 150 including a speed restrictor 300 constructed according to the principles of the present invention. As shown in FIG. 3, rear axle assembly 150 includes rear wheels 152 mounted on wheel hubs 154 engaging ends of rear axles 156, 158. The other ends of rear axles 156, 158 engage speed restrictor 300. A mounting assembly mounts rear axle assembly 150 to the undercarriage of chassis 110. Mounting assembly includes brackets 180 connected to the undercarriage of chassis 110, and through which rear axles 156, 158 pass, and a mounting plate 182 connected to housing 300 of speed restrictor.

Figure 4:
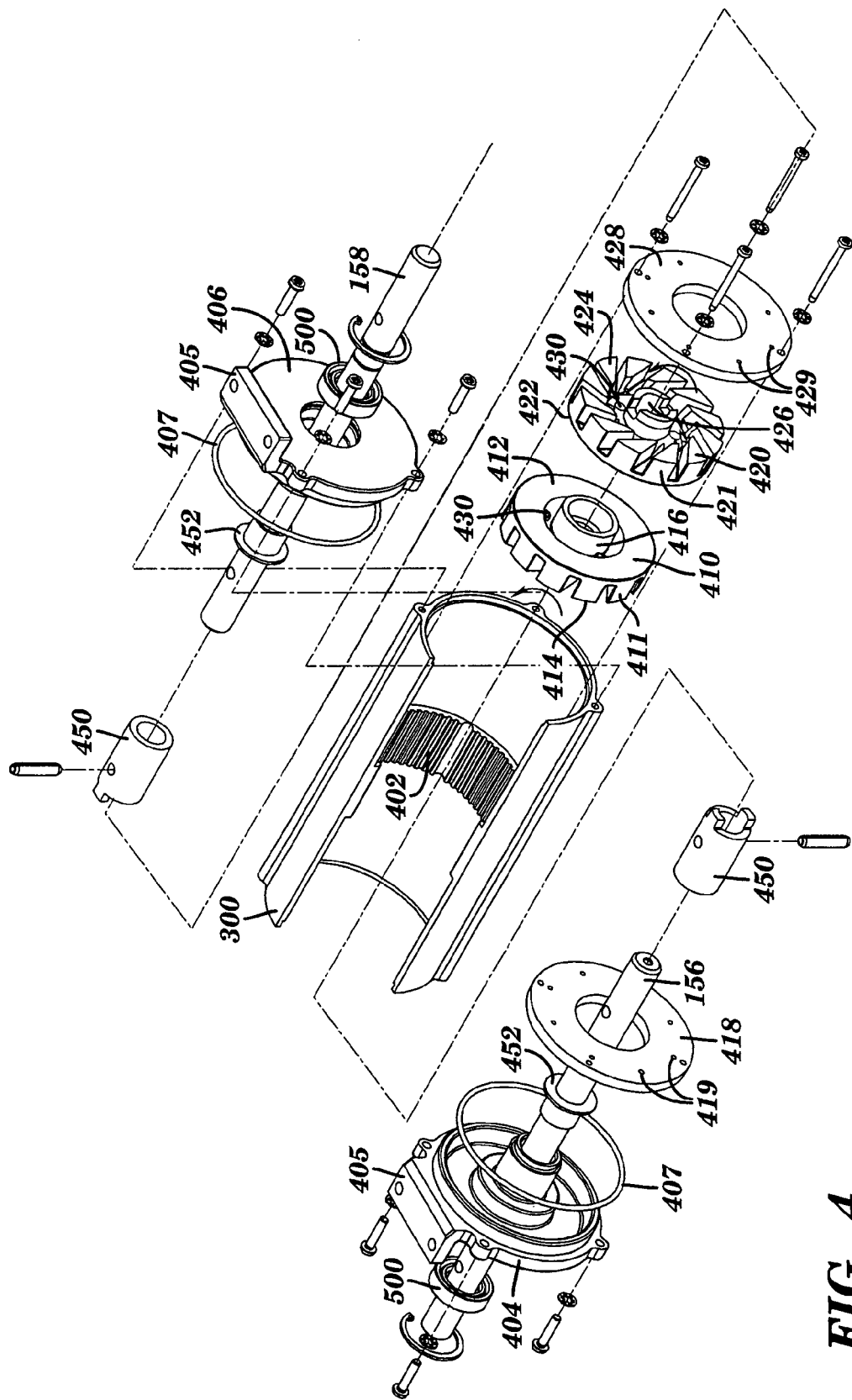
FIG. 4 depicts an exploded view of one embodiment of a speed restrictor constructed in accordance with the principles of the present invention.
Figure 6:
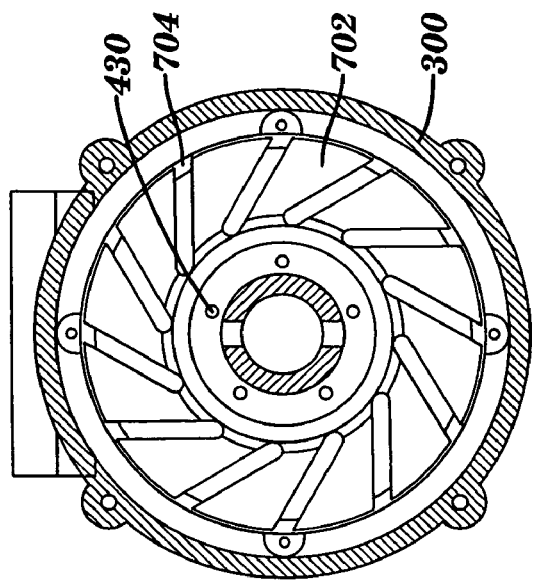
FIG. 6 depicts a side view of one embodiment of a rotor having 12 blades that may be utilized in a speed restrictor constructed in accordance with the principles of the present invention and taken along the line 6-6 in FIG. 5.
Figure 5:
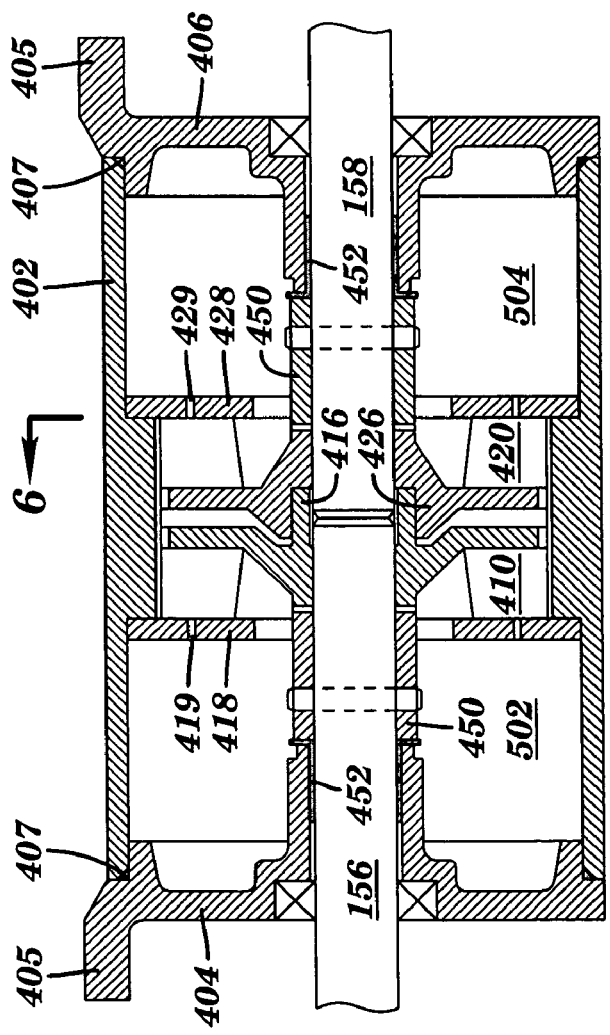
FIG. 5 depicts a cross-sectional view of the assembled speed restrictor shown in FIG. 4.
Figure 7:
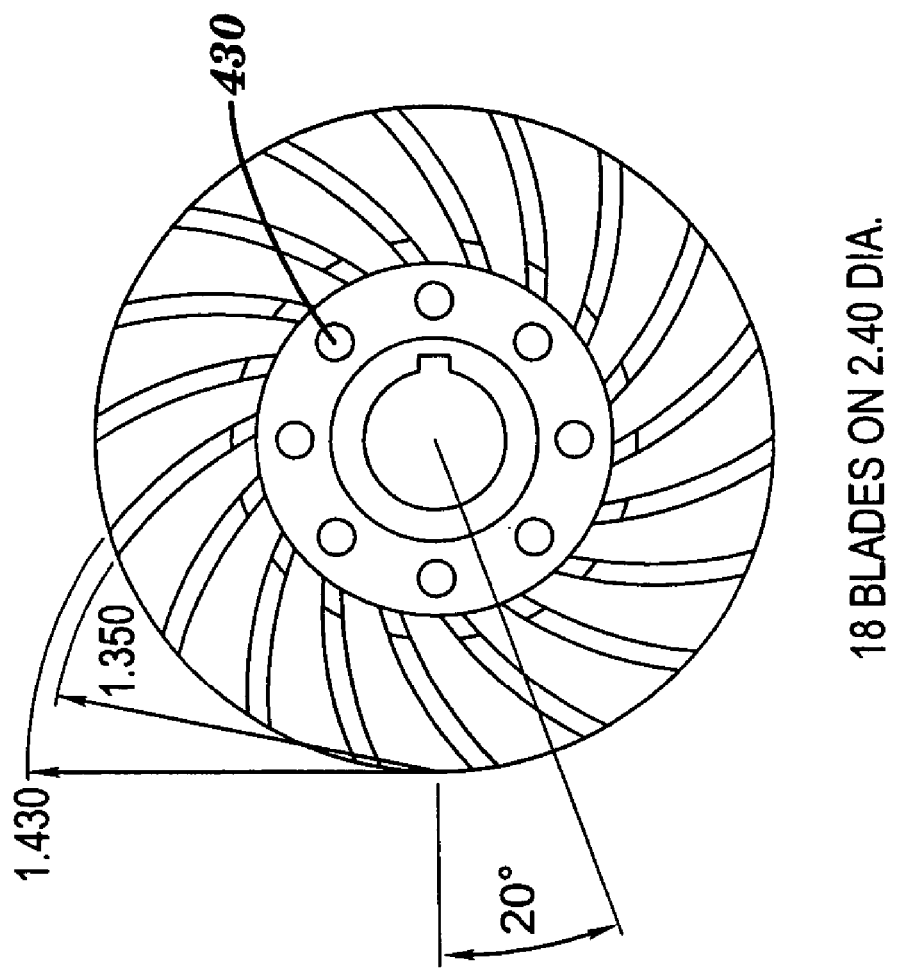
FIG. 7 depicts a side view of another embodiment of a rotor having 18 blades that may be utilized in a speed restrictor constructed in accordance with the principles of the present invention.
Figure 8A:
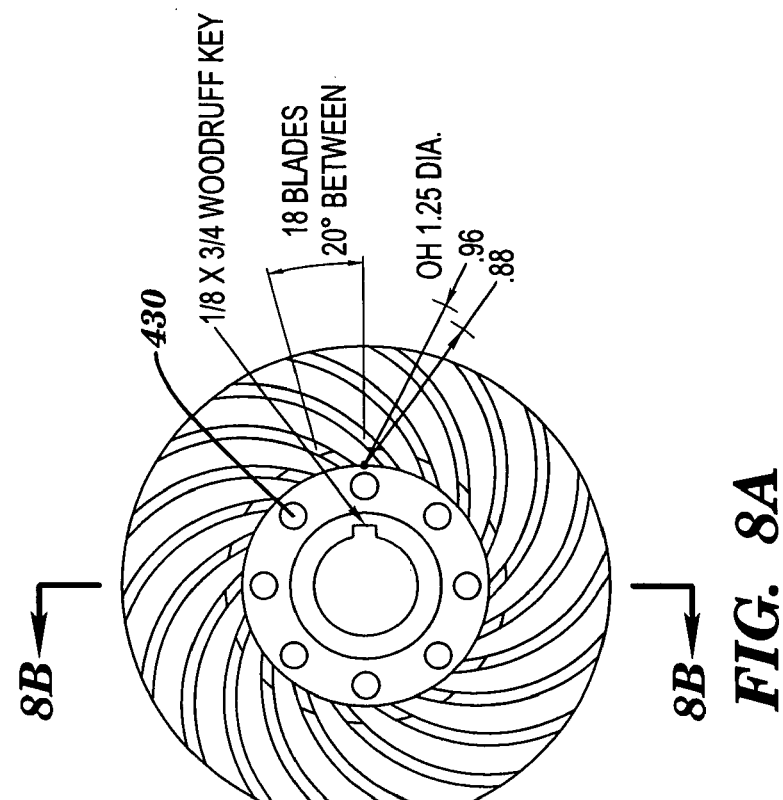
FIG. 8A depicts a side view of another embodiment of a rotor having 18 blades that may be utilized in a speed restrictor constructed in accordance with the principles of the present invention.
Figure 8B:
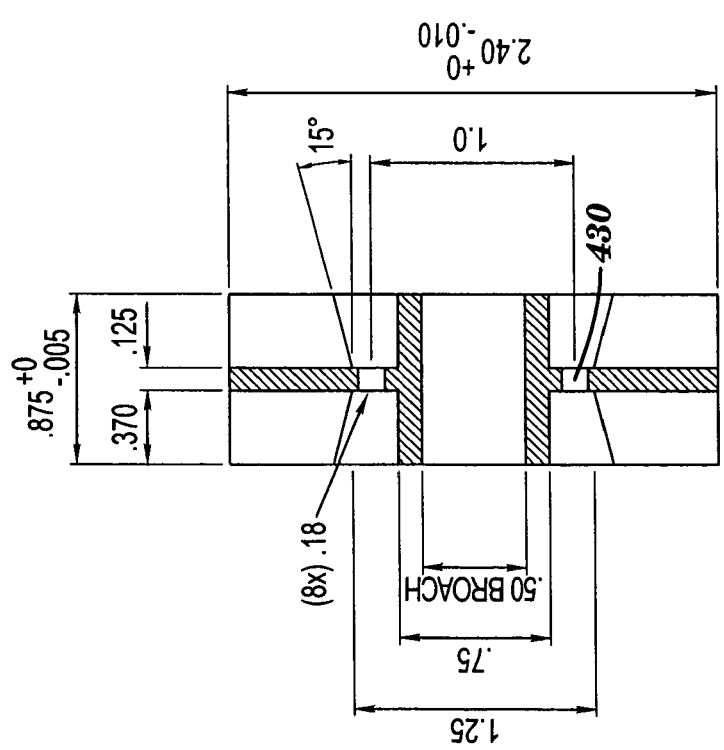
FIG. 8B depicts a cross-sectional view of the rotor shown in FIG. 8A taken along the line 8B-8B.
Figure 9A:
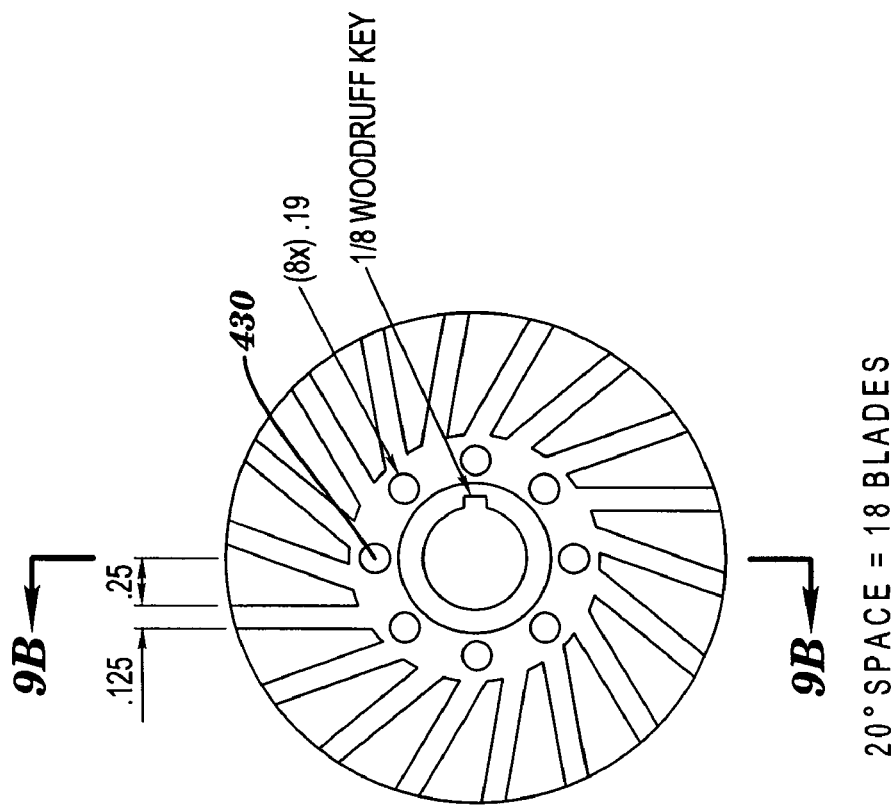
FIG. 9A depicts a side view of another embodiment of a rotor having 18 blades that may be utilized in a speed restrictor constructed in accordance with the principles of the present invention.
Figure 9B:
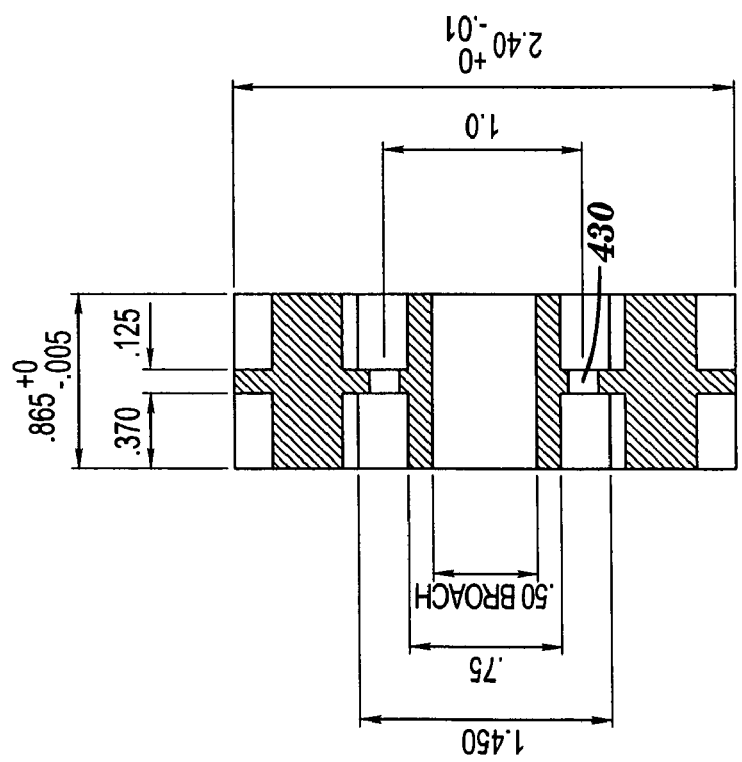
FIG. 9B depicts a cross-sectional view of the rotor shown in FIG. 9A taken along the line 9B-9B.
Figure 10A:
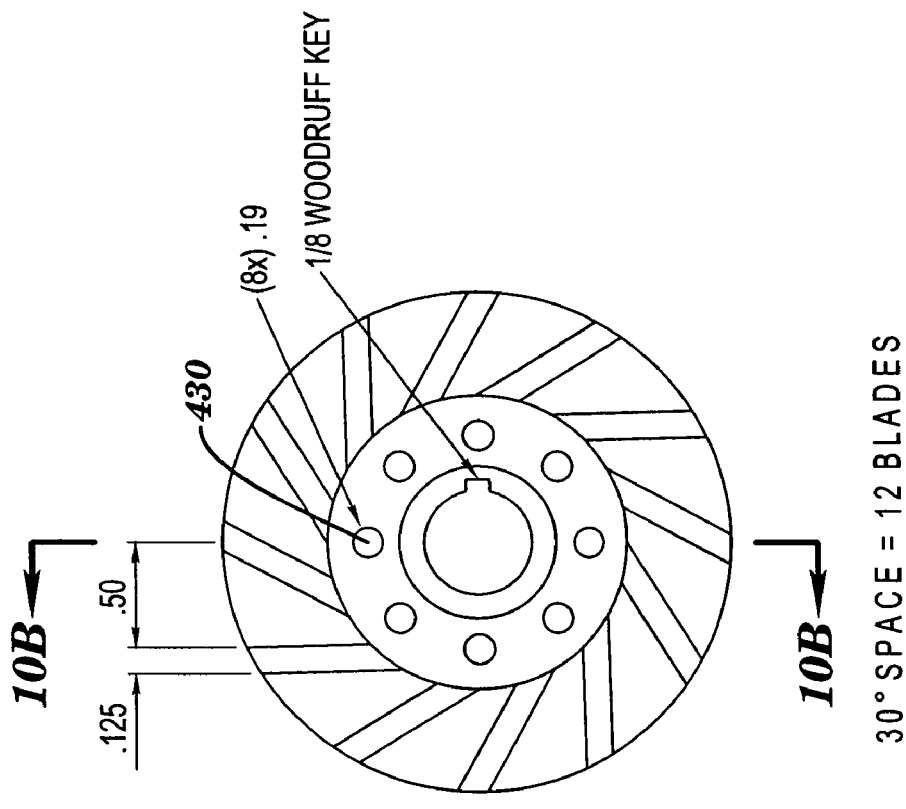
FIG. 10A depicts a side view of another embodiment of a rotor having 18 blades that may be utilized in a speed restrictor constructed in accordance with the principles of the present invention.
Figure 10B:
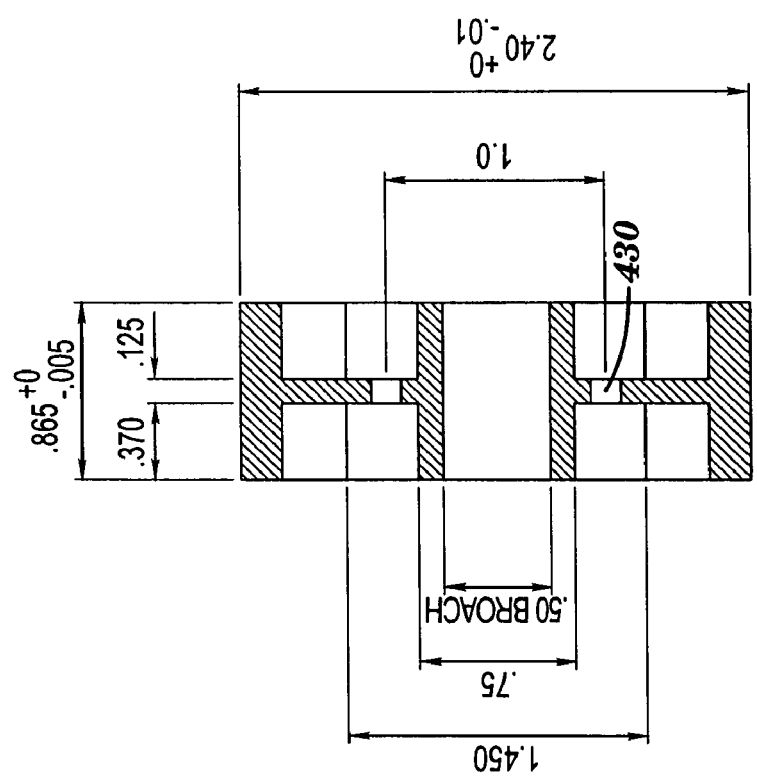
FIG. 10B depicts a cross-sectional view of the rotor shown in FIG. 10A taken along the line 10B-10B.

A first embodiment of speed restrictor constructed in accordance with one or more aspects of the present invention is illustrated in FIGS. 4 through 6. FIGS. 4 and 5 illustrate a speed restrictor utilizing two rear axles 156, 158, split in the middle between rear wheels 152, and two rotors 410, 420 engaging ends of rear axles 156, 158. Speed restrictor includes a housing 300 (which is cut away in FIG. 4 to show the interior wall of housing 300) having a first side 404 and a second side 406 bolted, secured or affixed to housing 300 with an o-ring 407 to provide sealing. Bearings 452 for rotation of rear axles 156, 158 are provided at the locations where rear axles 156, 158 pass through first and second sides 404, 406 of housing 300.

Housing 300, including first side 404 and second side 406, form a cavity for holding a fluid. First side 404 and second side 406 each have a flange 405 for attaching to mounting plate 182 (FIG. 3). The central portion of the interior wall of housing 300 between first side 404 and second side 406 includes a rough surface 402 including, for example, a plurality of ridges and valleys. A seal 500 is also provided at the location rear axles 156 and 158 pass through first side 404 and second side 406.

As illustrated in FIGS. 4 and 5, a connector 452 is telescopically received and secured near the ends of rear axles 156, 158. Connectors 452 engage rotors 410 and 420 and cause rotors 410, 420 to rotate with rear axles 156, 158, respectively, and rear wheels 152. Rotor 410 includes a first side 412 facing a first side 422 of rotor 420 and a second side 414 facing first side 404 of housing 300. Rotor 420 includes a second side 424 facing second side 406 of housing 300. Rotor 410 also includes a center hub 416 that receives a center hub 426 of rotor 412. Center hubs 416 and 426 assist with the proper alignment of rear axles 156 and 158 but do not effect the rotation of the other axles. A plurality of holes 430 surround center hubs 416 and 426 of rotors 410, 420.

A plate 418 including a plurality of holes 419 is positioned adjacent second side 414 of rotor 410 and a plate 428 also including a plurality of holes 429 is positioned adjacent second side 424 of rotor 420. Outer periphery surfaces 411, 421 of rotors 410, 420, respectively, face interior surface 402 of housing 300.

During operation, fluid enters and exits the middle section of housing 300 from and to fluid compartments 502, 504 (FIG. 5) through the plurality of holes 419, 429 formed in plates 418, 428, respectively, and the plurality of holes 430 formed in center hubs 416, 426 of rotors 410, 420, respectively. The plurality of holes 419, 429 formed in plates 418, 429, respectively, and the plurality of holes 430 formed in hubs 416, 426 of rotors 410, 420, respectively, provide fluid communication between the middle section of housing 300 and two outer fluid compartments 502, 504 to permit circulation of fluid during operation. Without these bypass holes, the operation of the rotors would run without circulation and continue to churn the same portion of fluid without any discharge to fluid compartments 502, 504.

As illustrated in FIG. 6, second sides 414 and 424 of rotors 410, 420, respectively, include a plurality of rotor blades 702 having narrow fluid channels (e.g. 704) and wide tips. Various other embodiments showing a plurality of rotor blades on second sides 414 and 424 of rotors 410, 420, respectively, that may be used in the speed restrictor constructed in accordance with the principles of the present invention, are illustrated in FIGS. 6 through 10B. The number and angles of fluid channels and rotor blades and the profiles of the same can affect the specific performance of the sled (e.g. drag v. speed) depending on the conditions of the track and desired speed. In alternative embodiments, rotor blades may be similar to a centrifugal pump impeller. Each of these rotor designs may vary in the width of the blade tips, angle of the blades, spacing of the blades, dimensions, number of blades used and other relevant characteristics known in the art.

In addition to using different types of rotors, the performance of speed restrictor can be affected by the type of fluid used. For example, the thicker the fluid used, the more resistance provided to the operation of the rotors used in the speed restrictor. The amount of resistance depends on the fluid viscosity. Variations from very little resistance to very high resistance depend on the fluid used. The type of fluid viscosity used also depends on the pitch of the slide or track. Although petroleum fluid may be used, it has been determined that petroleum fluid does not retain its initial viscosity as the friction energy is absorbed. During testing, the drag resistance of the restrictor declined by as much as 40% with a temperature rise of less than 100 degrees Fahrenheit. This loss of resistance diminishes the desired function of the speed restrictor.

Silicone fluid provides a more desired performance than petroleum fluid because it loses less viscosity with similar temperature rise. In fact, during testing using silicone fluid, a reduction of less than 2% resistance was registered in four minutes of running time with an RPM representing a speed of 22 miles per hour and a temperature rise of about 70 degrees Fahrenheit. Therefore, silicone fluid or a fluid with similar temperature stability characteristics offer better performance results with a speed restrictor constructed in accordance with the principles of the present invention.

During operation, the speed of the sled is limited by using a speed restrictor constructed in accordance with the principles of the present invention. As the sled travels down a track, rear wheels 152 rotate, causing rear axles 156, 158 to simultaneously rotate. The rotation of rear axles 156, 158 cause their respective rotors 410, 420 to also simultaneously rotate. The rotation of rotors 410, 420 causes fluid contained in housing 300 to circulate and forces fluid against the rough interior surface 402 of housing 300. As a result, resistance to the rotation of rotors caused by the interaction of the channels and tips of the rotors forcing fluid against rough interior surface 402 of housing 300 and through the plurality of holes 419, 429 limits the rotation speed of rear axles 156, 158 which in turn limits the rotation of rear wheels 152. Therefore, when the speed of rotation of rear wheels 152 reach the threshold resistance of the speed restrictor, the speed restrictor will restrict or limit the rear wheels 152 from rotating too fast. With the use of two axles 156, 158, the speed of rotation of each rear wheel is controlled separately by its respective rotor and interaction with rough interior surface 402 and fluid. For example, as the sled takes a turn or curve on the track, one rear wheel will turn faster than the other and the speed restrictor constructed in accordance with the principles of the present invention will restrict excess speed of each individual wheel and the sled overall.

Figure 11:
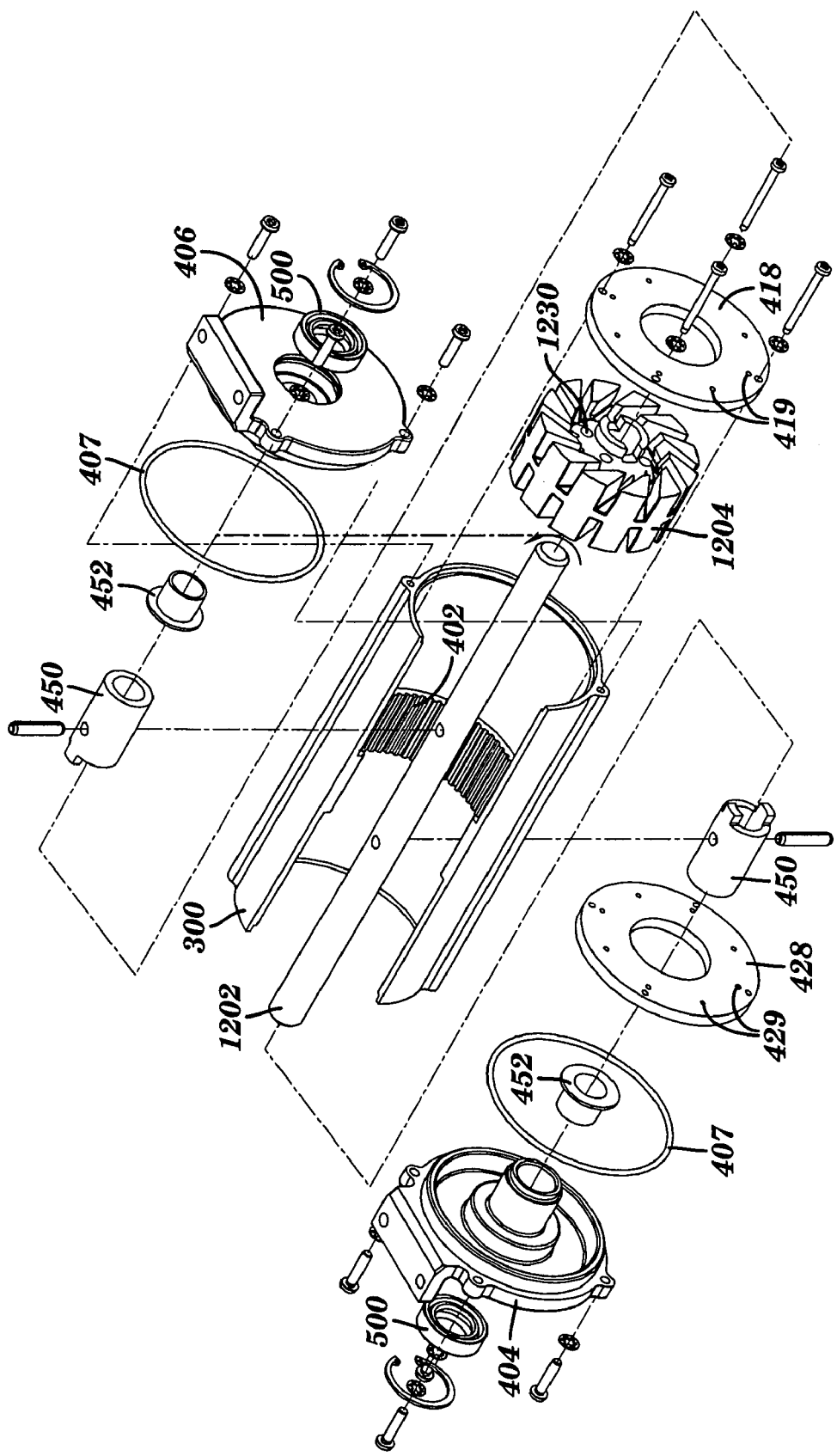
FIG. 11 depicts a cross-section view of another embodiment of a speed restrictor constructed in accordance with the principles of the present invention including one axle as part of a rear axle assembly.

In an alternative embodiment illustrated in FIG. 11, rear axle assembly may utilize one axle 1202 having a speed restrictor using one rotor 1204. In other embodiments, rear axle assembly may utilize more than two rear axles (e.g. three axles) and speed restrictors using one or more rotors. For a rear axle assembly having one axle and one rotor, as illustrated in FIG. 11, single axle 1202 passes through housing 300 and out first and second sides 404, 406. Seals 500 and o-rings or washers 407, to prevent leakage of the fluid contained within housing 300, and bearings 452, to provide for the rotation of single axle 1202, are provided at the locations where single axle 1202 passes through first and second sides 404, 406 of housing 300. Single rotor 1202 includes rotor blades on the opposing sides facing plates 418, 429 that are designed as previously discussed for rotors 410, 420.

During operation (or movement of the sled down a track), the revolution of rear wheels 152 simultaneously rotates single axle 1202 that drives single rotor 1204. As single rotor 1202 rotates, fluid is drawn into the middle section of housing 300 through holes 419, 429 in plates 418, 428, respectively, and forced against interior surface 402 of housing 300, causing rotational resistance or drag on the rotation of single rotor 1204. As rotor 1204 rotates faster, an increasing amount of friction is created, providing higher and higher resistance to the rotation of rotor 1204. This friction and resistance ultimately limits the rotational speed of single rotor 1204, which affects the rotational speed of single axle 1202 and, therefore, the rotational speed of rear wheels 152.

Figure 12:
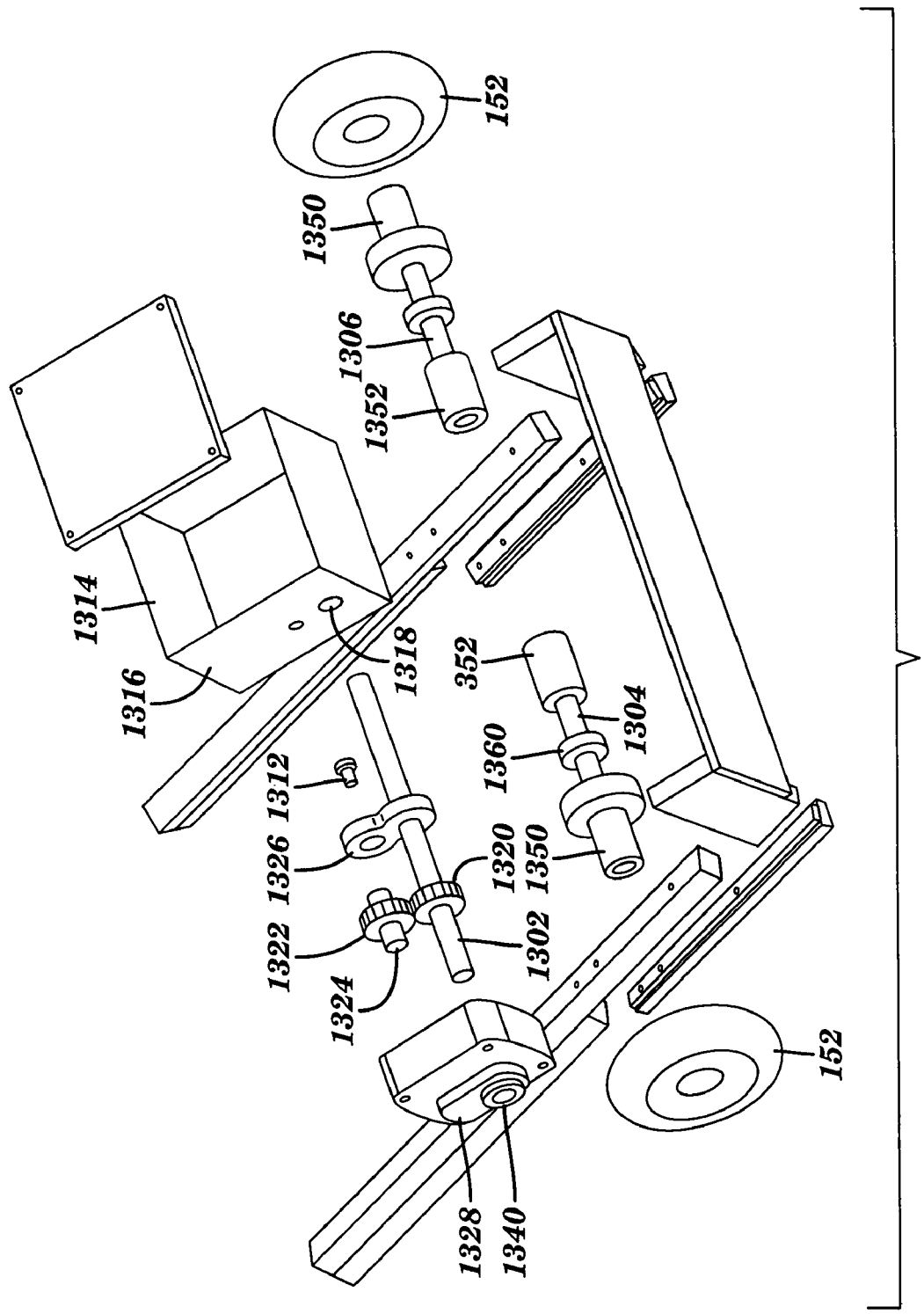
FIG. 12 depicts an exploded view of another embodiment of a speed restrictor constructed in accordance with the principles of the present invention.

FIG. 12 illustrates another embodiment of a speed restrictor constructed in accordance with the principles of the present invention for an alpine sled. As shown in FIG. 12, rear axle assembly includes a center axle 1302 connecting to wheel axles 1304, 1306 for rear wheels 152. Speed restrictor 1302 includes a hydraulic unit comprising a gear housing 1328 and a sealed fluid container 1314 to circulate a fluid to regulate the rotation of center axle 1302.

Gear housing 1328 contains a first hydraulic pump gear 1320 and a second hydraulic pump gear 1322. First hydraulic pump gear 320 passes through and rotates with center axle 1302. During movement of the sled, first hydraulic pump gear 1320 meshes with and drives second hydraulic pump gear 1322. A pump gear shaft 1324 supports the second hydraulic pump gear 1322. Floating pump bearings 1326 are positioned on both sides of first and second hydraulic pump gears 1320, 1322 to permit rotation of center axle 1302 and pump shaft 1324. Gear pump housing 1328 and an external side 1316 of fluid container 1314 form a cavity that houses first and second hydraulic gears 1320, 1324 and floating pump bearings 1326 and is in fluid communication with fluid container 314.

As first and second hydraulic pump gears 1320, 1324 come out of mesh, they create expanding volume on the inlet side of the gear pump. Fluid flows from fluid container 1314 through an intake 1318 formed in side 1316 of fluid container 1314 into gear pump housing 1328. The meshing of pump gears 1320, 1322 forces (e.g. under pressure) the fluid through an outlet port 1319 back into the fluid container. Flow restrictor or orifice 1312 is located in outlet port 1319 to regulate the amount of pumped fluid through outlet port 1319 to fluid container 1314 during rotation of first and second hydraulic gears 1320, 1322.

The ends of center axle 1302 pass through gear pump housing 1328 and sealed fluid container 1314, respectively, and connect to axles 1304, 1306 for rear wheels 152. A seal 1340, such as for example, a double lip oil seal, is positioned at both ends of center axle 1302 exiting gear pump housing 1328 and fluid container 1314 to prevent leaking of the fluid.

Each of rear wheels 152 connect to a wheel hub 1350 mounted on one end of a wheel shaft 304. The other end of wheel axle 1304 includes a one-way roller clutch 1352 engaging the end of main axle shaft 1302. Due to the clutches, the faster wheel axle controls the gear pump. The clutches 1352 are necessary as the wheels 152 turn at different speeds in the curves of the track. A bearing 1360, such as, for example, a double sealed bearing, is mounted between the two ends of the wheel shaft for mounting on chassis 200 of sled 100.

Wheel axles 1304, 1306, either individually or with the other wheel axle, powers the gear pump as the sled moves down the track. As the sled moves down the track, rear wheels 152 cause wheel axles 1304, 1306 to rotate, which, in turn, causes center axle 1302 to rotate. The rotation of center axle 1302 causes first hydraulic pump gear 1320 to turn. Due to the meshing relationship, the rotation of first hydraulic pump gear 1320 causes second hydraulic gear 1322 to also turn. First and second hydraulic pump gears 1320, 1322 cause fluid to flow through intake 1318 from fluid container 1314 and force fluid out discharge orifice 1312 back into fluid container

1314. The faster wheel axle, due to the one-way clutches, controls the gear pump. As mentioned above, the one-way clutch allows overrunning by one of the wheel axles because the wheels turn at different speeds, for example, in the curves.

As the sled travels faster, more fluid must flow through orifice 1312, creating higher and higher resistance to the rotation of first and second hydraulic gears 1320, 1322. This resistance limits the rotation speed of these gears, which affects the rotation speed of main axle shaft 1302, and, in turn, affects the rotation speed of wheel axles 1304. Therefore, the power required to pump fluid through orifice 1312 results in a drag on wheels 152 and ultimately slows the speed of the sled. This added friction on wheels 152 minimizes the risk that a rider will travel to fast to stay on the sled.

A hydraulic speed restrictor or governor construed in accordance with the principles of the present invention makes it possible to use a gravity driven vehicle equipped with rear wheels on higher pitch slide tracks by providing a more stable and safer sled. The stability of the sled will also provide a more enjoyable ride down the track and avoid the chance of injury to a rider.

Although preferred embodiments have been depicted and described herein, it will be apparent to those skilled in the relevant art that various modifications, additions, substitutions and the like can be made without departing from the spirit of the invention and these are therefore considered to be within the scope of the invention.

The invention claimed is:

1. A gravity driven vehicle, said gravity driven vehicle comprising:
   a chassis;
   a front axle assembly mounted to said chassis, said front axle assembly including at least one wheel on at least one front axle;
   at least one rear axle mounted to said chassis, the at least one rear axle directly connected to and rotatable with rear wheels mounted at ends of the at least one rear axle; and
   a speed restrictor engaging the at least one rear axle to control the rotation speed of the at least one rear axle of the rear axle assembly, said speed restrictor comprising:
   a sealed housing mounted to said chassis;
   a fluid sealably disposed in said housing;
   at least one rotor mounted on the at least one rear axle within said housing, said at least one rotor having an outer periphery surface facing an inner surface of said housing, said rotor having a plurality of blades disposed around and normal to an axis of the at least one rear axle, said plurality of blades defining a plurality of fluid channels therebetween;
   said housing having a first section and a second section, said at least one rotor mounted on the at least one rear axle within the first section of said housing, wherein the first section is in fluid communication with the second section;
   a plate disposed in said housing around the at least one rear axle and having first and second surfaces disposed normal to the axis of the at least one rear axle, said first surface of said plate being disposed adjacent to the plurality of blades and separating the first section from said second section, and said plate having at least one hole extending through said plate from said first surface to said second surface adjacent to said plurality of blades wherein said at least one hole in said plate permits fluid to pass between the first section to the second section;
   wherein fluid circulates between the first section and the second section through at least one hole in the plate; and
   wherein rotation of the at least one rear axle slows in response to resistance caused by fluid being forced against the inner surface of said housing during rotation of the at least one rear axle.

2. The gravity driven vehicle of claim 1, wherein the inner surface of said housing is a rough surface.

3. The gravity driven vehicle of claim 1, wherein said at least one rotor comprises twelve rotor blades.

4. The gravity driven vehicle of claim 1, wherein said fluid is a silicone fluid.

5. The gravity driven vehicle of claim 1, wherein said housing includes a third section, wherein the first section is positioned between the second section and third section of said housing, wherein the first section is in fluid communication with the third section.

6. The gravity driven vehicle of claim 5, further comprising a second plate disposed in said housing around the at least one rear axle and having first and second surfaces disposed normal to the axis of the at least one rear axle, said second plate separates the first section from the third section, and wherein the second plate has at least one hole disposed between said first and second normal surfaces permitting fluid to pass between the first section and the third section.

7. The gravity driven vehicle of claim 1, wherein said rear axle assembly includes two rear axles, wherein a rotor is mounted on an end of the two rear axles.

8. The gravity driven vehicle of claim 1, wherein said at least one rotor has at least one hole permitting fluid to pass therethrough.

9. The gravity driven vehicle of claim 1, wherein said sealed housing is fixedly mounted to the chassis of the gravity driven vehicle.

10. The gravity driven vehicle of claim 1, wherein said plurality of blades comprising a plurality of fixed blades and defining a plurality of fixed sized fluid channels therebetween.

11. The gravity driven vehicle of claim 1, wherein said plurality of blades comprising a plurality of fixed blades having wide tips and defining a plurality of fixed sized fluid channels therebetween.

12. The gravity driven vehicle of claim 1, wherein said plurality of blades comprising a plurality of fixed blades and defining a plurality of fixed sized narrow fluid channels therebetween.

13. The gravity driven vehicle of claim 12, wherein the inner surface of said housing comprises a plurality of ridges and valleys.

14. The gravity driven vehicle of claim 1, wherein the inner surface of said housing comprises a plurality of ridges and valleys.

15. The gravity driven vehicle of claim 1, wherein said sealed housing is fixedly mounted to the chassis of the gravity driven vehicle, said plurality of blades comprises a plurality of fixed blades having wide tips and defining a plurality of fixed sized narrow fluid channels therebetween.

16. A speed restrictor for a gravity driven vehicle, said speed restrictor comprising:
   a sealed housing mountable to a chassis of the gravity driven vehicle;
   at least one rotor mounted on at least one rotatable wheel axle of the gravity driven vehicle within said housing, said at least one rotor having an outer periphery surface facing an inner surface of said housing, said rotor having a plurality of blades disposed around and normal to an axis of the at least one wheel axle, said plurality of blades defining a plurality of fluid channels therebetween;

said housing includes a first section and a second section, said at least one rotor mounted on the at least one axle within the first section of said housing, wherein the first section is in fluid communication with the second section;

a fluid sealably disposed in said housing;

a plate disposed in said housing around the at least one wheel axle and having first and second surfaces disposed normal to the axis of the at least one wheel axle, said first surface of said plate being disposed adjacent to the plurality of blades and separating said first section from said second section, and said plate having at least one hole extending through said plate from said first surface to said second surface adjacent to said plurality of blades wherein said at least one hole in said plate permits fluid to pass between the first section to the second section;

wherein fluid circulates between the first section and the second section through at least one hole in the plate; and wherein rotation of the at least one wheel axle slows in response to resistance caused by fluid being forced against the inner surface of said housing during rotation of the at least one wheel axle.

17. The speed restrictor of claim 16, wherein the inner surface of said housing is a rough surface.

18. The speed restrictor of claim 16, wherein said at least one rotor comprises twelve rotor blades.

19. The speed restrictor of claim 16, wherein said fluid is a silicone fluid.

20. The speed restrictor of claim 16, wherein said housing includes a third section, wherein the first section is positioned between the second section and third section of said housing, wherein the first section is in fluid communication with the third section.

21. The speed restrictor of claim 20, further comprising a second plate disposed in said housing around the at least one rear axle and having first and second surfaces disposed normal to the axis of the at least one rear axle, said second plate separates the first section from the third section, and wherein the second plate has at least one hole disposed between said first and second normal surfaces permitting fluid to pass between the first section and the third section.

22. The speed restrictor of claim 16, wherein said rear axle assembly includes two rear axles, wherein a rotor is mounted on an end of the two rear axles.

23. The speed restrictor of claim 16, wherein said at least one rotor has at least one hole permitting fluid to pass therethrough.

24. The speed restrictor of claim 16, wherein said sealed housing is fixedly mountable to the chassis of the gravity driven vehicle.

25. The speed restrictor of claim 16, wherein said plurality of blades comprising a plurality of fixed blades and defining a plurality of fixed sized fluid channels therebetween.

26. The speed restrictor of claim 16, wherein said plurality of blades comprising a plurality of fixed blades having wide tips and defining a plurality of fixed sized fluid channels therebetween.

27. The speed restrictor of claim 16, wherein said plurality of blades comprising a plurality of fixed blades and defining a plurality of fixed sized narrow fluid channels therebetween.

28. The speed restrictor of claim 16, wherein the inner surface of said housing comprises a plurality of ridges and valleys.

29. The speed restrictor of claim 16, wherein said sealed housing is fixedly mountable to the chassis of the gravity driven vehicle, said plurality of blades comprises a plurality of fixed blades having wide tips and defining a plurality of fixed sized narrow fluid channels therebetween.

30. The speed restrictor of claim 29, wherein the inner surface of said housing comprises a plurality of ridges and valleys.

* * * * *